US009246623B2

United States Patent
Bathula et al.

(10) Patent No.: US 9,246,623 B2
(45) Date of Patent: Jan. 26, 2016

(54) METHOD AND APPARATUS FOR ROUTING TRAFFIC USING ASYMMETRICAL OPTICAL CONNECTIONS

(71) Applicant: AT&T Intellectual Property I, L.P., Atlanta, GA (US)

(72) Inventors: Balagangadhar G. Bathula, Lawrenceville, NJ (US); Angela L. Chiu, Holmdel, NJ (US); Mark David Feuer, Colts Neck, NJ (US); Rakesh Kumar Sinha, Edison, NJ (US); John Lester Strand, Nashua, NH (US); Sheryl Leigh Woodward, Holmdel, NJ (US); Weiyi Zhang, New Brunswick, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 95 days.

(21) Appl. No.: 14/094,407

(22) Filed: Dec. 2, 2013

(65) Prior Publication Data

US 2015/0155962 A1 Jun. 4, 2015

(51) Int. Cl.
 *H04J 14/02* (2006.01)
(52) U.S. Cl.
 CPC ................................ *H04J 14/0202* (2013.01)
(58) Field of Classification Search
 CPC . H04J 14/0206; H04J 14/021; H04J 14/0212; H04J 14/0213; H04J 14/0202
 See application file for complete search history.

(56) References Cited

U.S. PATENT DOCUMENTS

| 6,483,803 | B1 | 11/2002 | Elahmadi et al. |
| 7,519,294 | B2 | 4/2009 | Bullock |
| 7,725,029 | B1* | 5/2010 | Bernier et al. ................... 398/67 |
| 7,839,872 | B2* | 11/2010 | Diab et al. ..................... 370/401 |
| 8,543,957 | B2* | 9/2013 | Takita et al. ................... 716/130 |
| 8,554,074 | B2* | 10/2013 | Boertjes et al. ................. 398/49 |
| 2008/0279567 | A1 | 11/2008 | Huang et al. |
| 2011/0058811 | A1 | 3/2011 | Diab et al. |
| 2011/0150465 | A1 | 6/2011 | Ito |
| 2013/0209087 | A1 | 8/2013 | Yuan et al. |
| 2013/0230052 | A1* | 9/2013 | Gopalakrishna et al. ..... 370/401 |

FOREIGN PATENT DOCUMENTS

WO WO 0022765 4/2000

OTHER PUBLICATIONS

De Maesschalck, Sophie, et al. "Multi-layer traffic grooming in networks with an IP/MPLS layer on top of a meshed optical layer." Global Telecommunications Conference, 2003. GLOBECOM'03. IEEE. vol. 5. IEEE, 2003.

(Continued)

*Primary Examiner* — Dzung Tran

(57) ABSTRACT

A method, computer-readable storage device and apparatus for routing traffic in a reconfigurable optical add-drop multiplexer layer of a dense wavelength division multiplexing network are disclosed. For example, the method determines the reconfigurable optical add-drop multiplexer layer has asymmetric traffic, and routes the asymmetric traffic in the reconfigurable optical add-drop multiplexer layer over a plurality of asymmetrical optical connections, wherein the plurality of asymmetrical optical connections is provided with only uni-directional equipment in the reconfigurable optical add-drop multiplexer layer.

20 Claims, 3 Drawing Sheets

(56) References Cited

OTHER PUBLICATIONS

Junhu Guo, Jinyu Wang, Hui Li, Yuefeng Ji, "A new asymmetric spectrum assignment method to improve spectrum efficiency for spectrum-sliced optical network." Beijing Key Laboratory of Network System Architecture and Convergence, Beijing University of Posts and Telecommunications, Beijing 100876, China, 2013.

* cited by examiner

METHOD AND APPARATUS FOR ROUTING TRAFFIC USING ASYMMETRICAL OPTICAL CONNECTIONS

BACKGROUND

As traffic across communications networks grow at a very high rate, it is becoming increasingly important to make the optical network more efficient. Capacity across networks today is deployed in a symmetrical manner. For example, in some networks wavelength circuits provide the same capacity in both directions, with the result that the capacity in one direction is often wasted. Thus, optical equipment used to deploy capacity in both directions may add to costs of the overall network even though the optical equipment that provides equal capacity in both directions is not needed.

SUMMARY

In one embodiment, the present disclosure provides a method, computer-readable storage device and apparatus for routing traffic in a reconfigurable optical add-drop multiplexer layer of a dense wavelength division multiplexing network. In one embodiment, the method determines the reconfigurable optical add-drop multiplexer layer has asymmetric traffic, and routes the asymmetric traffic in the reconfigurable optical add-drop multiplexer layer over a plurality of asymmetrical optical connections, wherein the plurality of asymmetrical optical connections is provided with only uni-directional equipment in the reconfigurable optical add-drop multiplexer layer.

BRIEF DESCRIPTION OF THE DRAWINGS

The essence of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure relates generally to the design of or improvement of communications networks and, more particularly, to a method, computer-readable storage device and apparatus for routing traffic in a reconfigurable optical add-drop multiplexer layer of a dense wavelength division multiplexing network. As discussed above, as traffic across communications networks grow at a very high rate, it is becoming increasingly important to make the optical network more efficient. Capacity across optical networks today is deployed in a symmetrical manner. For example, in some networks wavelength circuits provide the same capacity in both directions, with the result that the capacity in one direction is often wasted. Thus, optical equipment used to deploy capacity in both directions may add to costs of the overall network even though the optical equipment that provides equal capacity in both directions is not needed.

One embodiment of the present disclosure identifies those networks that have asymmetric traffic patterns (e.g., more bandwidth is used or an amount of traffic in one direction is greater than in another direction) and deploys or replaces all bi-directional equipment (e.g., bi-directional transceivers which are deployed in pairs, e.g., one at each terminating node, to service bi-directional connections between two nodes) with uni-directional equipment (e.g., transmitters or receivers, which are deployed in pairs at two nodes to serve a uni-directional connection from one node to the other). As a result, a substantial cost savings and efficiency is gained as the overall cost of equipment is reduced since some directions may support less bandwidth than other directions and require less bi-directional equipment. In addition, bandwidth is not wasted as bi-directional equipment provides the same bandwidth in both directions and are deployed based upon the highest required bandwidth in one direction.

Figure 1:
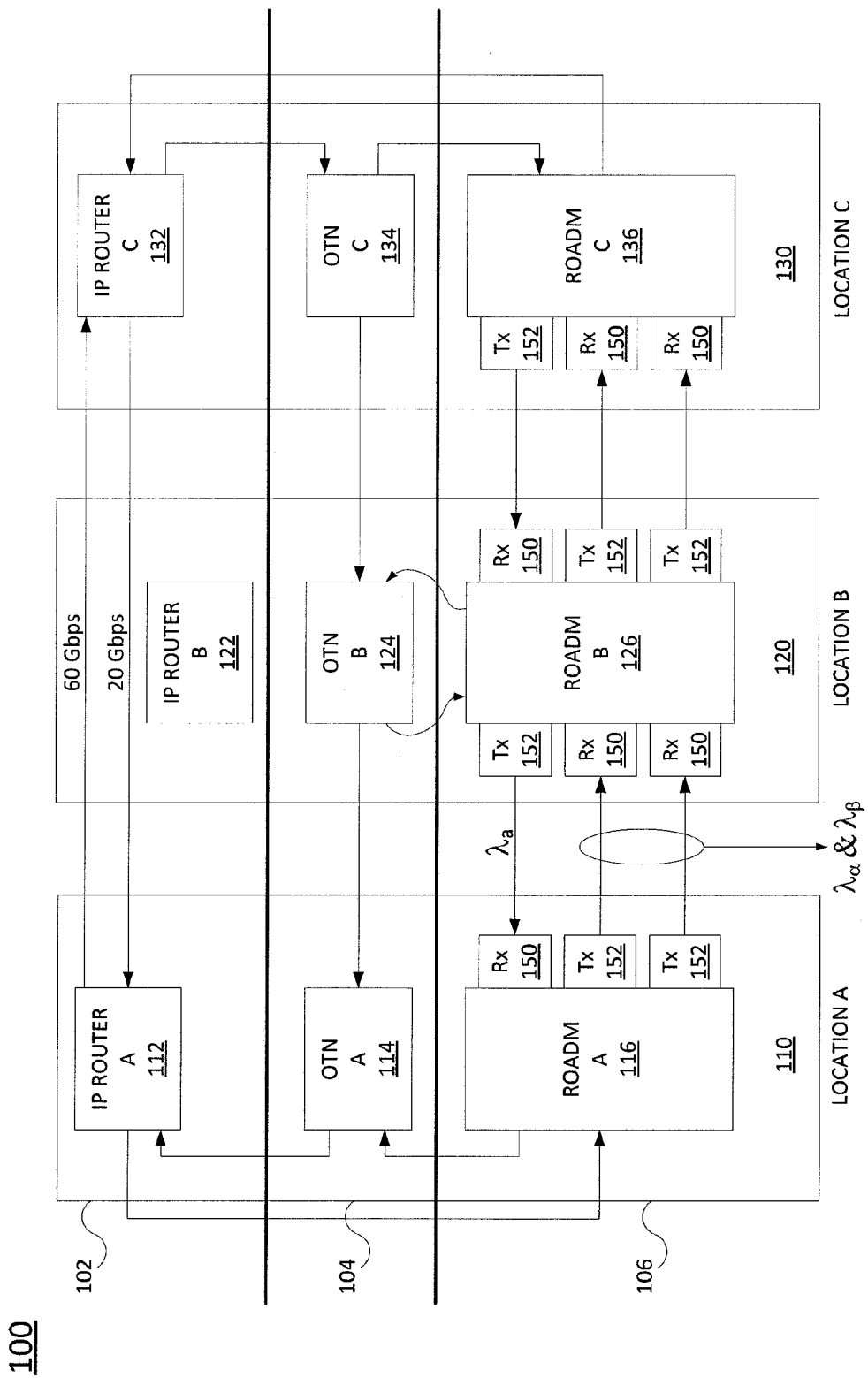
FIG. 1 illustrates one example of a communications network of the present disclosure.

FIG. 1 illustrates an example communication network 100 of the present disclosure. In one embodiment, the communication network 100 may be a DWDM network. In one embodiment, the optical network 100 may include an Internet Protocol (IP) layer 102, an optical transport network (OTN) layer 104 and a reconfigurable optical add-drop multiplexer (ROADM) layer 106.

In one embodiment, the communication network 100 may span three different locations 110, 120 and 130 (also labeled as location A, location B and location C). In one embodiment, each one of the locations 110, 120 and 130 may include an IP router, an OTN switch and a ROADM node. For example, the location 110 may include an IP router A 112, an OTN switch A 114 and a ROADM node A 116. The location 120 may include an IP router B 122, an OTN switch B 124 and a ROADM node B 126. The location 130 may include an IP router C 132, an OTN switch C 134 and a ROADM node C 136.

It should be noted that although three different locations are illustrated, the present disclosure may apply to any different number of locations within the communication network 100. It should also be noted that although only a single IP router, a single OTN switch and a single ROADM node are illustrated in each one of the locations in FIG. 1, the communication network 100 may include any number of IP routers, OTN switches and ROADM nodes at any one of the locations.

As illustrated in FIG. 1, in one embodiment, the communication network 100 may support 60 gigabytes per second (Gbps) in one direction (e.g., from IP router A 112 to IP router C 132) and 20 Gbps in another direction (e.g., from IP router C 132 to IP router A 112). In previous optical network topologies, bi-directional equipment would be deployed to support the required bandwidth in both directions. For example, two 40 Gbps transceivers (e.g., 80 total Gbps) may be deployed at the ROADM layer 106 to support the 60 Gbps in the one direction. However, since the bi-directional equipment provides the same bandwidth in all directions, the bi-directional equipment would also provide 80 total Gbps in the other direction that only requires 20 Gbps. As a result, 60 Gbps of bandwidth would be wasted as well as the money used to purchase the bi-directional equipment that provides the unneeded bandwidth in both directions.

However, one embodiment of the present disclosure creates asymmetrical optical connections in the communication network 100 using uni-directional equipment to reduce the overall cost of the communication network 100, to reduce wasted bandwidth in the communication network 100 and to increase the efficiency of the optical network 100. It should be noted that the present communication network 100 is specifically for core backbone networks within a communication network or mesh networks. In other words, the present disclosure does not include access networks, broadcast networks or cable networks such as passive optical networks (PONs) that distribute data from one to many (e.g., from a cable headend to many subscribers). Currently, core backbone networks and regional/metro networks are all deployed using bi-directional equipment that provides the same bandwidth in all directions regardless of the actual amount of bandwidth needed in a particular direction.

For example, FIG. 1 illustrates how uni-directional receivers (Rx) 150 and uni-directional transmitters (Tx) 152 may be deployed. In one embodiment, bi-directional transceivers having an equal amount of bandwidth in both directions may be replaced with the uni-directional receivers 150 and the uni-directional transmitters 152.

For example, the uni-directional equipment may be capable of sending or transmitting a maximum of 40 Gbps. Using the example above, since the bi-directional transceiver provided 80 Gbps to support the needed 60 Gbps in a direction from the ROADM A router 116 to the ROADM C router 136, two receivers 150 and two transmitters 152 are deployed at each ROADM node 116, 126 and 136 in a direction from the ROADM A node 116 to the ROADM C node 136.

In the opposite direction from ROADM C router 136 to the ROADM A router 116, only 20 Gbps need to be supported. As a result, only a single receiver 150 and a single transmitter 152 are deployed in a direction from ROADM C router 136 to the ROADM A router 116. Thus, in the communication network 100, a plurality of asymmetric optical connections is created. For example, 80 Gbps of bandwidth is available in one direction and only 40 Gbps is available in a second opposite direction. In other words, by using the asymmetrical optical connections, the communication network 100 only deploys an extra 40 Gbps of capacity (e.g., 20 Gbps in one direction and 20 Gbps in an opposite direction) versus an extra 80 Gbps of capacity (e.g., 60 Gbps in one direction and 20 Gbps in an opposite direction) that would be deployed in current optical networks that use bi-directional equipment having the same bandwidth in each direction.

In addition, the previous optical networks would by-pass the OTN layer 104. In contrast, the creation of the asymmetric optical connections allows the communication network 100 to change the route of the asymmetric traffic from by-passing the OTN layer 104 to passing through the OTN layer 104 via the OTN switch A 114, the OTN switch B 124 and the OTN switch C 134. The asymmetric traffic may be multiplexed with OTN circuits serving other links in the communication network 100. As a result, the wavelength serving the 20 Gbps link may not bypass or express through the ROADM node B 126.

As noted above, the embodiments of the present disclosure are specific to an optical network, for example DWDM networks, having a ROADM layer 106 may be found in core backbone networks (e.g., Internet Protocol/Multi-Protocol Label Switching (IP/MPLS) networks) or regional/metro networks. In other words, the present disclosure is not intended to apply to all networks in general, but rather a specific type of network with a ROADM layer.

The ROADM may be defined as an optical add-drop multiplexer that adds the ability to add, drop or express-through individual wavelengths from wavelength division multiplexing (WDM) system at the ROADM node. Furthermore, which wavelength is to be added, dropped, or expressed through is reconfigurable under remote control. This allows individual or multiple wavelengths carrying data channels to be added and/or dropped from a transport fiber without the need to convert the signals on all of the WDM channels to electronic signals and back again to optical signals. This enables many wavelengths to travel through the ROADM node without optical/electronic/optical (OEO) regeneration, while other wavelengths carrying data channels can originate or be received at a node. The data channels routed through the OTN and/or the IP layer. This reduces the equipment required at each node. ROADMs also allow for remote configuration and reconfiguration and automatic power balancing. ROADMs can be directionless (e.g., ability to send wavelengths in any direction), colorless (e.g., ability to send wavelengths on any port on the network node). The ROADM may be, for example, a wavelength blocking ROADM, a planar lightwave circuit ROADM In one embodiment, the remote switching may be achieved through a user of a wavelength selective switching module. For example, an outgoing optical signal can be generated and multiplexed onto the DWDM transport system (e.g., the add operation) or an incoming optical signal may be dropped from the DWDM transport system and terminated (e.g., the drop operation). A beam may also be passed through the device without modification (e.g., the express-through operation).

Figure 2:
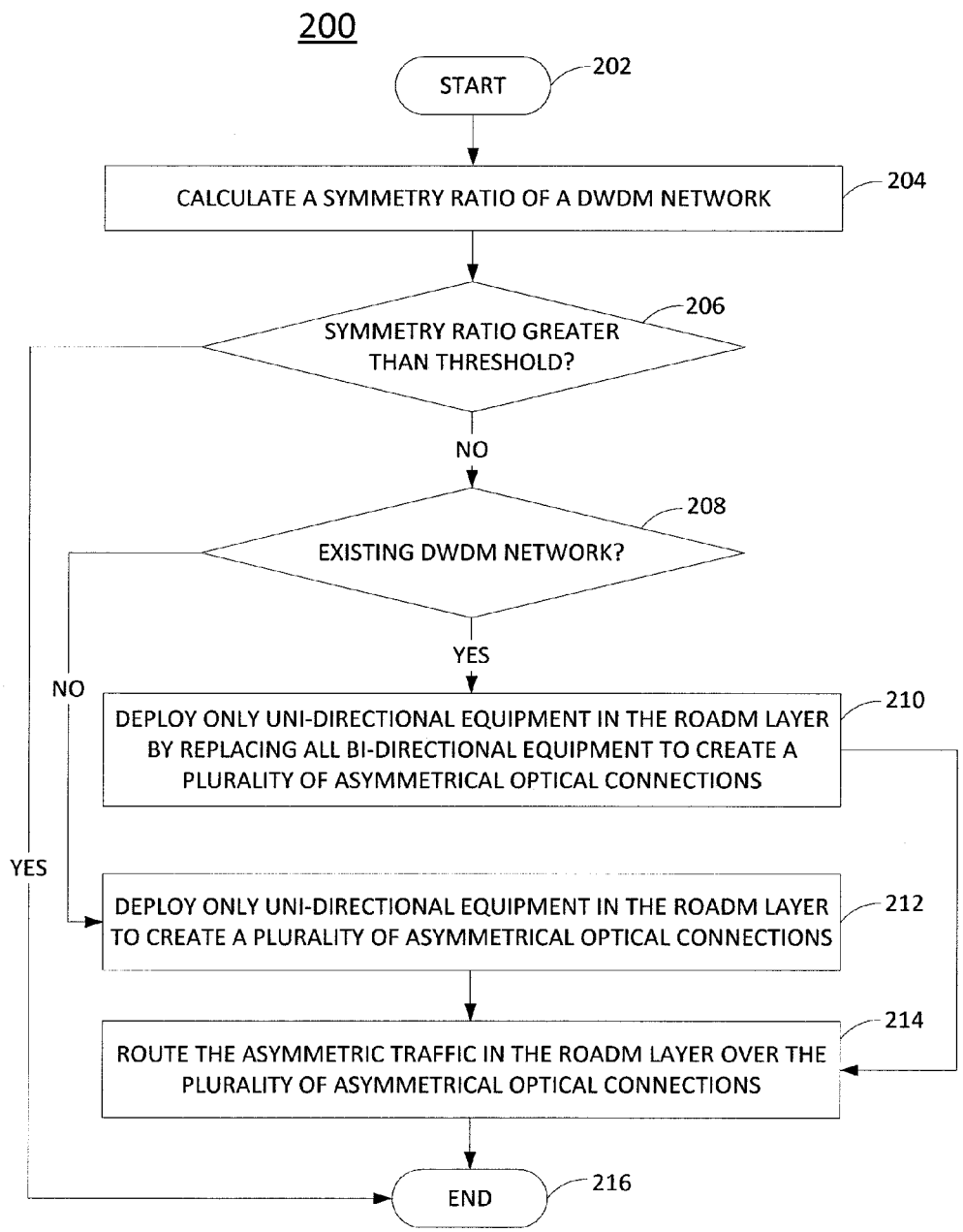
FIG. 2 illustrates an example flowchart of a method for routing traffic in a reconfigurable optical add-drop multiplexer layer of a dense wavelength division multiplexing network.
Figure 3:
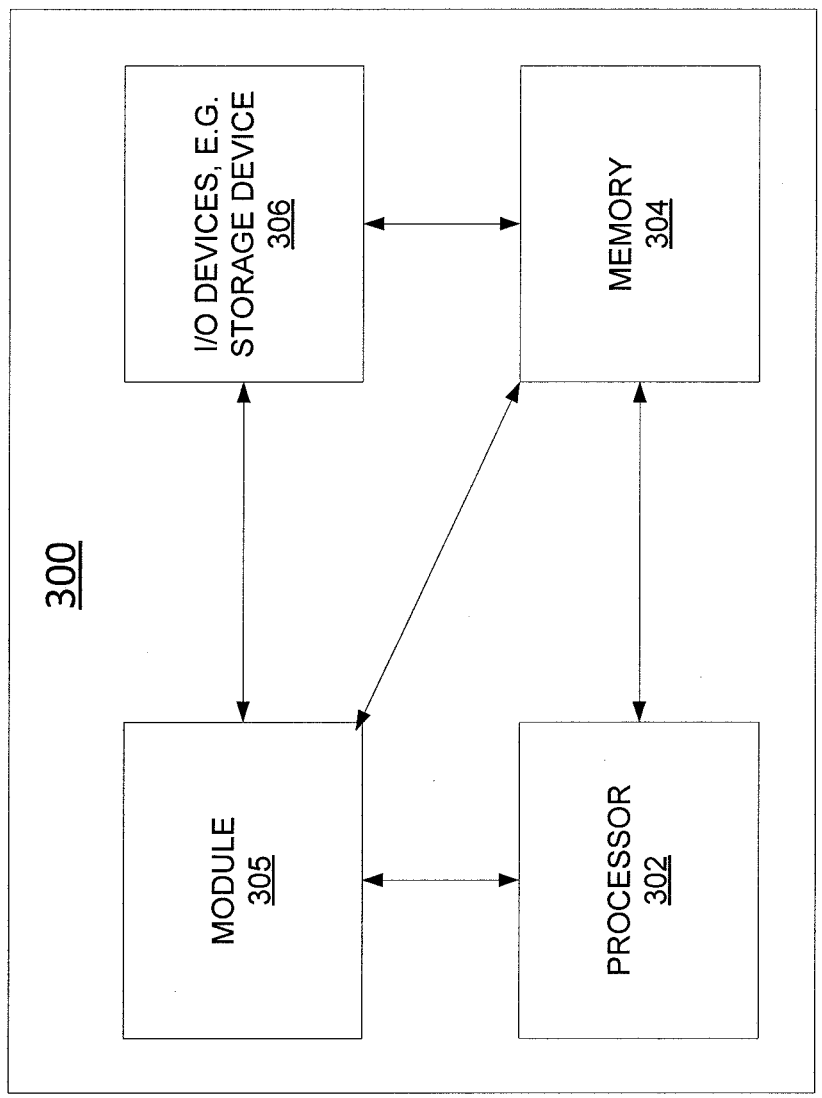
FIG. 3 illustrates a high-level block diagram of a general-purpose computer suitable for use in performing the functions described herein.

FIG. 2 illustrates a flowchart of a method 200 for routing traffic in a reconfigurable optical add-drop multiplexer layer of a dense wavelength division multiplexing network. In one embodiment, the method 200 may be performed by a general purpose computer as illustrated in FIG. 3 and discussed below.

The method 200 begins at step 202. At step 204, the method 200 calculates a symmetry ratio of a dense wavelength division multiplexing network (DWDM). For example, in one embodiment the symmetry ratio may be calculated in accordance with Equation 1 below:

$$\rho_{network} = \frac{\sum_i [\min(t(A_i \rightarrow Z_i), t(Z_i \rightarrow A_i))]}{\sum_i [\max(t(A_i \rightarrow Z_i), t(Z_i \rightarrow A_i))]}, \quad \text{Equation 1}$$

wherein $\rho_{network}$ is the symmetry ratio of the entire network, $t(Z_i \rightarrow A_i)$ is an amount of traffic in bits per second traveling from node Z to node A for each link i and $t(A_i \rightarrow Z_i)$ is an amount of traffic in bits per second traveling from node A to node Z for each link i.

At step 206, the method 200 determines if the symmetry ratio is greater than a threshold. In one embodiment, the threshold for the symmetry ratio may be 0.5. If the symmetry ratio is greater than the threshold, then the traffic on the DWDM network is relatively symmetric and no changes are needed. The method 200 may proceed to step 216 where the method 200 ends.

However, referring back to step 206 if the method 200 determines that the symmetry ratio is less than the threshold, the traffic on the DWDM network is asymmetric. The method may proceed to step 208.

At step 208, the method 200 determines if there is an existing DWDM network. For example, the symmetry ratio may be calculated for a newly designed DWDM that is about to be implemented or installed or for an existing DWDM network. If the symmetry ratio was calculated for a DWDM network that does not exist yet, the method 200 may proceed to step 210.

At step 210, the method 200 may deploy only uni-directional equipment in the reconfigurable optical add-drop multiplexer (ROADM) layer by replacing all bi-directional equipment to create a plurality of asymmetrical optical connections. For example, the bi-directional equipment may be bi-directional transceivers and the uni-directional equipment may comprise a transmitter only or a receiver only. In other words, the uni-directional equipment only sends data in one direction or receives data in one direction at a time (e.g., in a directionless ROADM the uni-directional transmitter may transmit East during one time period, and the ROADM can then be reconfigured so that the transmitter is transmitting West during another time period).

In one embodiment, the bi-directional equipment serving asymmetric optical connections between two nodes may be replaced by uni-directional equipment by determining a required bandwidth for each direction between the two nodes. Then, a number of the uni-directional equipment may be deployed for each direction between the two nodes based upon the required bandwidth of each direction and the maximum bandwidth supported by the uni-directional equipment. For example, if a first direction of the optical connection requires 60 Gbps and the second direction requires 20 Gbps and the uni-directional equipment only supports a maximum of 40 Gbps, then two of the uni-directional transmitters would be needed to serve the first direction and one uni-directional transmitter would be required serve the second direction. These would replace the bi-directional equipment required to support 60 Gbps in both directions. The method may then proceed to step 214.

Referring back to step 208, if the symmetry ratio was calculated for a DWDM network that does not exist, then the method 200 may proceed to step 212. At step 212, the method 200 may deploy only uni-directional equipment in the ROADM layer to create a plurality of asymmetrical optical connections. For example, since the DWDM network is not yet deployed, the DWDM network may be designed and implemented initially using only uni-directional equipment in the ROADM layer. The method 200 may then proceed to step 214.

At step 214, the method 200 routes the asymmetric traffic in the ROADM layer over the plurality of asymmetrical optical connections. In one embodiment, routing the asymmetric traffic using the plurality of asymmetrical optical connections may result in changing a route of the asymmetric traffic. For example, the route may, in one direction, travel from an IP layer to the ROADM layer by by-passing an OTN layer in a traditional optical network using bi-directional equipment. However, by using the uni-directional equipment to create the asymmetrical optical connections, the route may be changed to travel from the IP layer to the ROADM layer via the OTN layer, as illustrated in FIG. 1 and described above.

As a result, a substantial cost savings and efficiency is gained as the overall cost of equipment is reduced since some directions may now support less bandwidth than other directions and require less uni-directional equipment. In addition, bandwidth is not wasted as bi-directional equipment provides the same bandwidth in both directions and are deployed based upon the highest required bandwidth in one direction. The method 200 then proceeds to step 216 where the method 200 ends.

It should be noted that although not explicitly specified, one or more steps or operation of the method 200 described above may include a storing, displaying and/or outputting step as required for a particular application. In other words, any data, records, fields, and/or intermediate results discussed in the methods can be stored, displayed, and/or outputted to another device as required for a particular application. Furthermore, steps, operations or blocks in FIG. 2 that recite a determining operation, or involve a decision, do not necessarily require that both branches of the determining operation be practiced. In other words, one of the branches of the determining operation can be deemed as an optional step.

FIG. 3 depicts a high-level block diagram of a general-purpose computer suitable for use in performing the functions described herein. As depicted in FIG. 3, the system 300 comprises one or more hardware processor elements 302 (e.g., a central processing unit (CPU), a microprocessor, or a multi-core processor), a memory 304, e.g., random access memory (RAM) and/or read only memory (ROM), a module 305 for routing traffic in a reconfigurable optical add-drop multiplexer layer of a dense wavelength division multiplexing network, and various input/output devices 306 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the general-purpose computer may employ a plurality of processor elements. Furthermore, although only one general-purpose computer is shown in the figure, if the method(s) as discussed above is implemented in a distributed or parallel manner for a particular illustrative example, i.e., the steps of the above method(s) or the entire method(s) are implemented across multiple or parallel general-purpose computers, then the general-purpose computer of this figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 305 for routing traffic in a reconfigurable optical add-drop multiplexer layer of a dense wavelength division multiplexing network (e.g., a software program comprising computer-executable instructions) can be loaded into memory 304 and executed by hardware processor element 302 to implement the steps, functions or operations as discussed above in connection with the exemplary method 200. Furthermore, when a hardware processor executes instructions to perform "operations", this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 305 for routing traffic in a reconfigurable optical add-drop multiplexer layer of a dense wavelength division multiplexing network (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for routing traffic in a reconfigurable optical add-drop multiplexer layer of a dense wavelength division multiplexing network, the method comprising:

determining, by a processor, the reconfigurable optical add-drop multiplexer layer has asymmetric traffic; and routing, by the processor, the asymmetric traffic in the reconfigurable optical add-drop multiplexer layer over a plurality of asymmetrical optical connections, wherein the plurality of asymmetrical optical connections is provided with only uni-directional equipment in the reconfigurable optical add-drop multiplexer layer, wherein the uni-directional equipment is for replacing bi-directional equipment.

2. The method of claim 1, wherein the reconfigurable optical add-drop multiplexer layer is in communication with an internet protocol layer and an optical transport network layer.

3. The method of claim 1, wherein the asymmetric traffic is determined by a symmetry ratio of an entire network being below a threshold.

4. The method of claim 3, wherein the symmetry ratio is calculated by an equation of, $$\rho_{network} = \frac{\sum_i [\min(t(A_i \to Z_i), t(Z_i \to A_i))]}{\sum_i [\max(t(A_i \to Z_i), t(Z_i \to A_i))]}$$

wherein $\rho_{network}$ the symmetry ratio of the entire network, i represents each of one or more links, $t(Z_i \to A_i)$ is an amount of traffic in bits per second traveling from a node Z to a node A for each link i and $t(A_i \to Z_i)$ is an amount of traffic in bits per second traveling from the node A to the node Z for each link i.

5. The method of claim 1, wherein the replacing comprises:
determining a required bandwidth of each direction supported by the bi-directional equipment;
determining a maximum bandwidth supported by the uni-directional equipment; and
deploying a number of the uni-directional equipment for each direction supported by the bi-directional equipment based upon the required bandwidth of each direction supported by the bi-directional equipment and the maximum bandwidth supported by the uni-directional equipment.

6. The method of claim 5, wherein the bi-directional equipment comprises a transceiver.

7. The method of claim 1, wherein the routing comprises:
changing, by the processor, a route of the asymmetric traffic in one direction from travelling directly from an internet protocol layer to the reconfigurable optical add-drop multiplexer layer by by-passing an optical transport network layer to travelling from the internet protocol layer to the reconfigurable optical add-drop multiplexer layer via the optical transport network layer.

8. A non-transitory computer-readable storage device storing a plurality of instructions which, when executed by a processor, cause the processor to perform operations for routing traffic in a reconfigurable optical add-drop multiplexer layer of a dense wavelength division multiplexing network, the operations comprising:

determining the reconfigurable optical add-drop multiplexer layer has asymmetric traffic; and routing the asymmetric traffic in the reconfigurable optical add-drop multiplexer layer over a plurality of asymmetrical optical connections, wherein the plurality of asymmetrical optical connections is provided with only uni-directional equipment in the reconfigurable optical add-drop multiplexer layer, wherein the uni-directional equipment is for replacing bi-directional equipment.

9. The non-transitory computer-readable storage device of claim 8, wherein the reconfigurable optical add-drop multiplexer layer is in communication with an internet protocol layer and an optical transport network layer.

10. The non-transitory computer-readable storage device of claim 8, wherein the asymmetric traffic is determined by a symmetry ratio of an entire network being below a threshold.

11. The non-transitory computer-readable storage device of claim 10, wherein the symmetry ratio is calculated by an equation of, $$\rho_{network} = \frac{\sum_i [\min(t(A_i \to Z_i), t(Z_i \to A_i))]}{\sum_i [\max(t(A_i \to Z_i), t(Z_i \to A_i))]}$$

wherein $\rho_{network}$ is the symmetry ratio of the entire network, i represents each of one or more links, $t(Z_i \to A_i)$ is an amount of traffic in bits per second traveling from a node Z to a node A for each link i and $t(A_i \to Z_i)$ is an amount of traffic in bits per second traveling from the node A to the node Z for each link i.

12. The non-transitory computer-readable storage device of claim 8, wherein the replacing comprises:
determining a required bandwidth of each direction supported by the bi-directional equipment;
determining a maximum bandwidth supported by the uni-directional equipment; and
deploying a number of the uni-directional equipment for each direction supported by the bi-directional equipment based upon the required bandwidth of each direction supported by the bi-directional equipment and the maximum bandwidth supported by the uni-directional equipment.

13. The non-transitory computer-readable storage device of claim 12, wherein the bi-directional equipment comprises a transceiver.

14. The non-transitory computer-readable storage device of claim 8, wherein the routing comprises:
changing a route of the asymmetric traffic in one direction from travelling directly from an internet protocol layer to the reconfigurable optical add-drop multiplexer layer by by-passing an optical transport network layer to travelling from the internet protocol layer to the reconfigurable optical add-drop multiplexer layer via the optical transport network layer.

15. An apparatus for routing traffic in a reconfigurable optical add-drop multiplexer layer of a dense wavelength division multiplexing network, the apparatus comprising:
a processor; and
a computer-readable storage device storing a plurality of instructions which, when executed by the processor, cause the processor to perform operations, the operations comprising:
determining the reconfigurable optical add-drop multiplexer layer has asymmetric traffic; and
routing the asymmetric traffic in the reconfigurable optical add-drop multiplexer layer over a plurality of asymmetrical optical connections, wherein the plurality of asymmetrical optical connections is provided with only uni-directional equipment in the reconfigurable optical add-drop multiplexer layer, wherein the uni-directional equipment is for replacing bi-directional equipment.

16. The apparatus of claim 15, wherein the reconfigurable optical add-drop multiplexer layer is in communication with an internet protocol layer and an optical transport network layer.

17. The apparatus of claim 15, wherein the asymmetric traffic is determined by a symmetry ratio of an entire network being below a threshold.

18. The apparatus of claim 17, wherein the symmetry ratio is calculated by an equation of, $$\rho_{network} = \frac{\sum_i [\min(t(A_i \rightarrow Z_i), t(Z_i \rightarrow A_i))]}{\sum_i [\max(t(A_i \rightarrow Z_i), t(Z_i \rightarrow A_i))]},$$

wherein $\rho_{network}$ is the symmetry ratio of the entire network, i represents each of one or more links, $t(Z_i \rightarrow A_i)$ is an amount of traffic in bits per second traveling from a node Z to a node A for each link i and $t(A_i \rightarrow Z_i)$ is an amount of traffic in bits per second traveling from the node A to the node Z for each link i.

19. The apparatus of claim 15, wherein the replacing comprises:
determining a required bandwidth of each direction supported by the bi-directional equipment;
determining a maximum bandwidth supported by the uni-directional equipment; and
deploying a number of the uni-directional equipment for each direction supported by the bi-directional equipment based upon the required bandwidth of each direction supported by the bi-directional equipment and the maximum bandwidth supported by the uni-directional equipment.

20. The apparatus of claim 19, wherein the bi-directional equipment comprises a transceiver.

* * * * *